Dec. 17, 1963  A. W. KAMMERER  3,114,416
LINER HANGER AND LINER MILLING TOOL
Filed Nov. 13, 1961  2 Sheets-Sheet 1

INVENTOR.
ARCHER W. KAMMERER
BY
Bernard Kriegel
ATTORNEY.

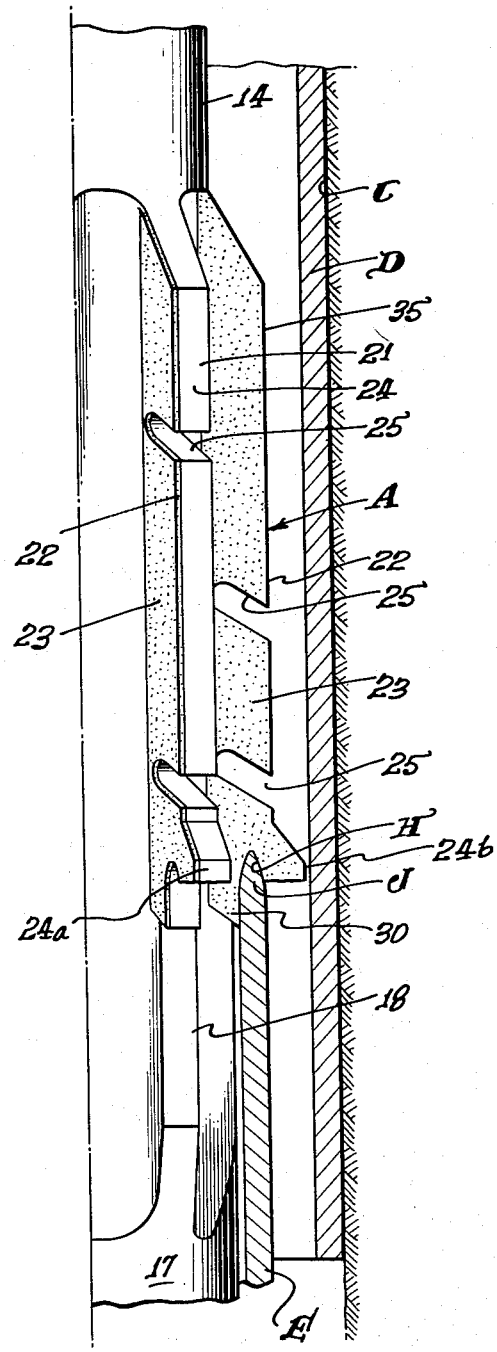
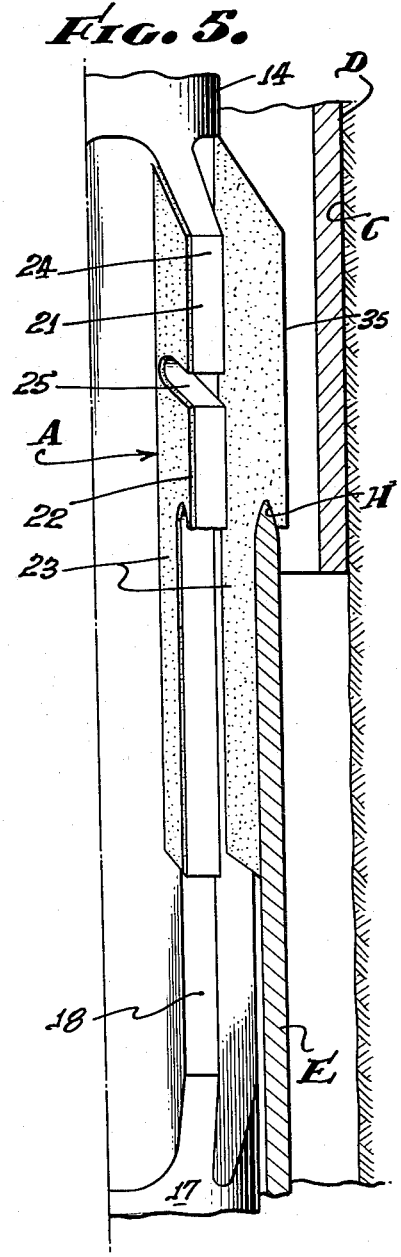

United States Patent Office 3,114,416
Patented Dec. 17, 1963

3,114,416
LINER HANGER AND LINER MILLING TOOL
Archer W. Kammerer, 800 N. Raymond Ave., Fullerton, Calif.
Filed Nov. 13, 1961, Ser. No. 151,678
7 Claims. (Cl. 166—55.7)

The present invention relates to subsurface well bore equipment, and more particularly to apparatus or tools for milling away liner hangers and liners, casings, and other tubular conduits and members disposed in well bores.

Liners are run through casing in a well bore and supported in overlapping relation to the casing, usually at its lower portion, through the agency of a liner hanger. The extent of overlap may be quite substantial. For example, it may be about 30 feet. The liner has a smaller outside diameter than the liner hanger supporting it to the casing. As a result, when it is desired to mill away the liner hanger and the portion of the liner suspended therebelow, the milling tool or apparatus must have an effective milling diameter almost equaling the set or expanded diameter of the liner hanger, which is essentially the inside diameter of the casing.

Liners oftentimes become supported in casings in an eccentric or offset position relative to the latter. Such eccentric relationship causes the pilot portion of a liner mill to enter the liner and force the cutters of the milling tool against the wall of the casing, large torque being required to effect rotation of the mill, because of the bearing of the cutters against the casing wall, with the resulting hazards of twist-off of the drilling string and cutting of the casing. At times, rotation of the mill may not be possible. To overcome the above difficulties in milling away eccentrically disposed liner hangers and liners, it has heretofore been necessary to first use a mill having a relatively large effective drilling diameter to mill away the liner hanger, this mill then being removed from the hole and a mill with cutter blades having a smaller milling diameter than run in the casing to mill away the liner itself. Such a small diameter tool can be used, since the ouside diameter of the liner is less than that of the liner hanger. Despite the eccentricity of the liner in the casing, the outer sides of the smaller blades will not bear against the casing wall. The necessity for using two milling tools and the taking of two round trips in the well bore to disintegrate the liner hanger and the liner obviously increases the cost of the operation to a considerable extent, as well as the time required to effect its performance.

Accordingly, an object of the present invention is to provide a liner hanger and liner mill capable of effectively disintegrating a liner hanger and a liner therebelow arranged in a well casing, bearing of the milling cutters or blades against the casing being avoided during milling of substantially the entire desired length of the liner in the well bore. A single milling apparatus is used for disintegrating the liner hanger and the liner therebelow, despite the fact that the liner may be disposed eccentrically in the well casing and overlap the latter over an extended length. As a result, excessive torque is avoided, as well as the need for employing a plurality of milling tools and a plurality of round trips in the well bore.

Another object of the invention is to provide a liner hanger and liner mill capable of effectively disintegrating the hanger and a liner suspended therebelow and disposed in a well casing, the sides of the milling cutters or blades being smaller than was heretofore necessary, as well as the amount of hardfacing material required for application to such blades.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 4 is an enlarged side elevational view of the milling tool operating upon the liner itself, after the liner hanger has been fully disintegrated;

FIG. 5 is a view similar to FIG. 4 illustrating the condition of the milling tool after an extended length of the liner has been cut away by the milling tool;

Figure 1:
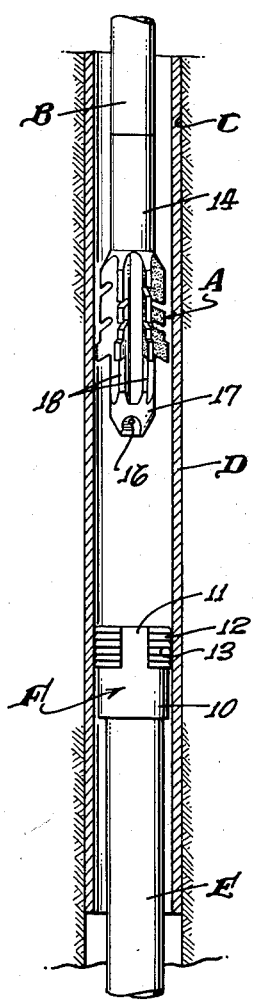
FIGURE 1 is a side elevational view of a milling tool being lowered in a well casing, from which a liner is suspended by a liner hanger.
Figure 2:
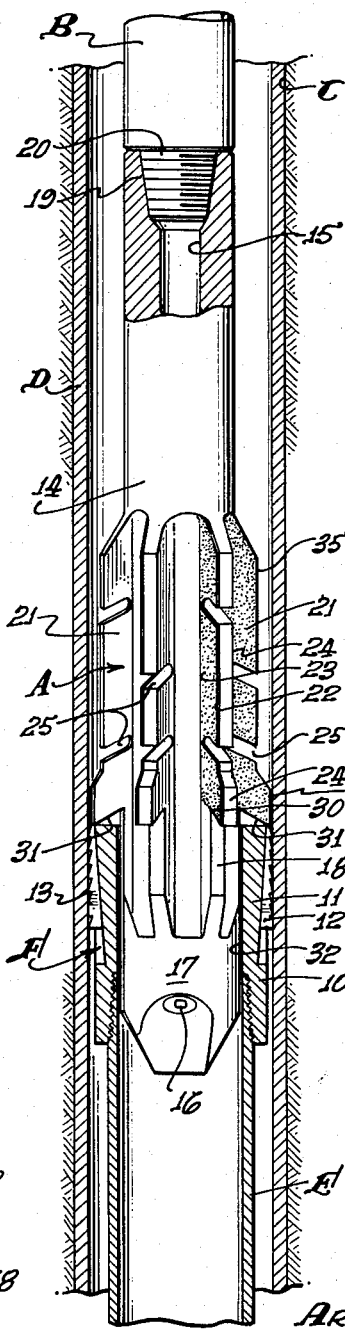
FIG. 2 is a side elevational view of the milling apparatus disposed in a well bore and commencing to mill or cut away the liner hanger.
Figure 3:
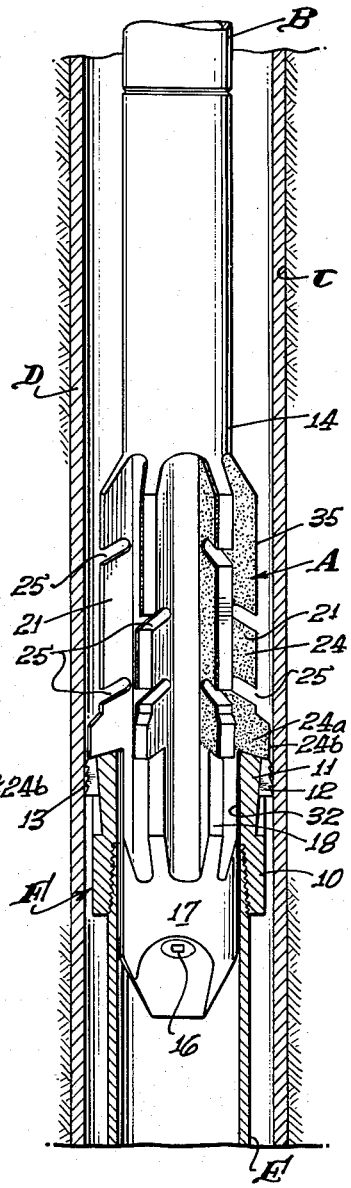
FIG. 3 is a view similar to FIG. 2 showing the condition of the milling tool with the liner hanger partially disintegrated.
Figure 6:
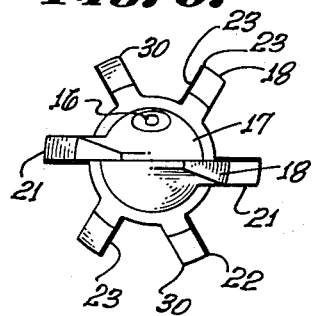
FIG. 6 is a bottom plan view of the milling tool.

The apparatus A illustrated in the drawings is a milling tool connectible to the lower end of a string of drill pipe B extending to the top of a well bore C that contains a string of casing D from which a liner E is suspended by means of a liner hanger F of any suitable type. As an example, the liner hanger F may have a tubular body portion 10 and a tapered expander 11 coacting with tapered slips 12 to embed the teeth 13 of the slips into the wall of the well casing D. The liner E is threadedly or otherwise secured to the liner hanger F and extends therebelow. The outside diameter of the liner E is substantially less than the effective diameter of the liner hanger F with its slips 12 embedded in the wall of the well casing D.

The milling tool or apparatus A includes a tubular body 14 having a central passage 15 therethrough for receiving drilling fluid pumped down the drill pipe B, the fluid discharging through one or more ports or nozzles 16 in a pilot or guide portion 17 of the bit, constituting the lower portion of the body. The pilot portion 17 has an effective, outside diameter only slightly less than the inside diameter of the liner E, so as to center the apparatus A within the liner hanger F and the liner E. Above the pilot or guide portion 17, the body of the tool has a plurality of circumferentially spaced radial centering ribs 18, having an effective diameter substantially the same as the pilot portion 17; that is to say, slightly less than the inside diameter of the liner E and of the body 10 of the liner hanger F.

The body 10 of the tool has an upper threaded box 19 for receiving the lower threaded pin 20 of the string of drill pipe B thereabove, for the purpose of firmly securing the apparatus to the drill pipe.

The liner E and the liner hanger F are milled away under the action of sets of elongate cutter blades 21 integral with the body 14 and extending generally radially outwardly therefrom. The leading faces 22 of the cutter blades have hardfacing material 23, such as tungsten carbide, welded or brazed thereto for action upon the liner and the liner hanger. Each set of cutter blades 21 is constituted by aligned blade segments 24, 24a, separated from one another by transverse slots or grooves 25. As the result of their milling action upon the liner hanger F and the liner E, they will wear away and eventually break off, being removed from the well bore C by the drilling fluid pumped down the drill string B, through the body passage 15 and discharging through the nozzles or ports 16.

The lower portion or segment 24a of each blade 21 extends radially outwardly of the body 14 to a substantially greater extent than the remaining portions 24 of each blade thereabove. The maximum radius of the lower portion 24a from the axis of the body 14 is only slightly less than the inside radius of the casing string D and the radius of the liner hanger slips 12 when in their expanded position in engagement with the wall of the casing. The inner end 30 of each blade 21, including its lower portion 24a, extends outwardly from the body axis by a radius or distance which is less than the inner radius of the liner hanger body 10 and the liner E itself, so that the lower end 31 of the lower blade portion 24a engages the liner hanger F from its inner wall 32 substantially to the outer end of the slips 12, to perform a milling action thereon and cutting away or disintegrating of the hanger as a result of rotating the drilling string B and the milling tool A and applying sufficient downweight to the latter. The upper portions 24 of each blade also have inner ends extending from the body 14 at a radius less than the inside radius of the liner hanger F and the liner E. Their outer portion or longitudinal edge 35 only extends from the axis of the tool body to a radius which is substantially less than the outer radius of the lower blade portion or segment 24a, but which is greater than the outside diameter of the liner E. Preferably, the radius of the upper blade portions 24 is slightly greater than the radius of any couplings (not shown) in the liner string E securing the liner sections together.

The lower blade segments 24a of larger radius or effective milling diameter have a longitudinal extent sufficient for milling away the entire length of the liner hanger F. As the liner hanger F is milled away, the lower blade portions 24a are worn away in an upward direction, and after the liner hanger has been completely milled away, a short length of such larger radius blade portions still remains for milling action upon the line E itself. However, the larger radius blade portions 24a are only made of such length as to be fully worn away after only a relatively short length of liner E, below the disintegrated liner hanger F, has been cut away by them. As a result of their operation upon the liner E, the latter wears a longitudinal groove H upwardly through the blades 21 and to a transverse slot 25 above each larger blade portion 24a. The outer part 24b of the larger blade portion will then break off from the remainder of the blade and be flushed away by the circulating fluid. The upper blade portions 24 then remain, which have a much smaller effective radius than the larger blade portion 24a. Such upper blade portions have a substantial clearance with the wall of the casing, being spaced inwardly away from this wall to a substantial extent, so that they will not bear thereagainst. The upper blade portions 24 are then effective to cut upon the upper end J of the liner E, the latter progressively wearing the grooves H upwardly in these portions. As the longitudinal grooves H in the blades wear upwardly toward each successive slot 25, the outer parts of the blade segments 24 break off and are flushed away by the drilling fluid. The downward milling away of the liner proceeds until a desired length has been disintegrated, after which the drill pipe B and the milling tool A are withdrawn from the well casing D.

In the use of the apparatus A, it is lowered in the well casing D on the end of the drill string B until the lower ends 31 of the larger blade sections 24a engage the liner hanger F. The drill string and the milling tool are then rotated at a proper speed, with the proper weight being imposed upon the blades to force them against the liner hanger F, the blades 24a cutting away or disintegrating the liner hanger F in a downward direction. The cuttings are removed by the circulating fluid pumped down the drill pipe B, through the passage 15 of the body of the tool and out through the nozzles or ports 16, the circulating fluid carrying the cuttings upwardly around the exterior of the drill pipe B to the top of the hole C. The guide 17 and centering ribs 18 center the tool in the liner hanger F and in the liner E itself. In the event the liner hanger F is disposed eccentrically in the well casing D, the larger radius or effective drilling diameter blade portions 24a will successively bear against one side of the casing. However, only a relatively small bearing surface is present, because of the short length of the larger blade portions 24a, holding the torque required to rotate the milling tool below an excessive value. As the blades 24a are worn away, as the result of their milling action upon the liner hanger F, the remaining length bearing against the casing progressively decreases, so that the blade area bearing against the casing wall also decreases, requiring less torque to rotate the tool A in the well bore.

After the entire length of the liner hanger F has been disintegrated, the remaining portions of the lower blades 24a begin operating upon the upper portion J of the liner E, the latter cutting the grooves H upwardly in the blades. When the grooves have been cut substantially to the slots 25 immediately above the larger blade portions 24a, the outer parts of the latter break off and will be flushed out of the hole by the circulating fluid. Thereafter, only the smaller radius blade portions 24 remain, which have too small a radius to bear against the wall of the well casing D. As a result, the tool A is properly centered in the liner E, these upper blade portions acting upon the liner and disintegrating it as the result of rotating the milling tool by the drilling string, and imposing the appropriate amount of drilling weight thereon, the circulating fluid carrying the cuttings to the top of the hole. Despite any eccentricity of the liner E in the casing, the blades 24 will not bear against the wall of the well casing D into which the liner overlaps. The entire cross-sectional area or wall thickness of the liner E is removed or disintegrated, since the upper blades 24 extend outwardly beyond the outer surface of the liner.

It is, accordingly, evident that the liner hanger and liner milling tool is capable of effectively milling away an entire liner despite the fact that the liner hanger may be eccentrically disposed in the well casing. After the liner hanger has been disintegrated, the tool can continue to disintegrate the liner itself downwardly along its length to the desired extent. These actions can occur with a single tool and without the necessity for a plurality of round trips in the well bore with different size milling tools. Very little casing resistance to turning of the milling tool is encountered during the disintegration of the liner hanger, and whatever casing resistance is encountered disappears when the lower portions 24a are eroded away or break off, in view of the lesser effective diameter of the upper blade members 24. Being of a lesser radial extent, these upper segments 24 also require less hardfacing 23.

I claim:

1. In apparatus for milling away tubular means disposed in a well bore: a tubular body adapted to be secured to a drill string and having a fluid passage therein; circumferentially spaced blades carried by and extending generally radially outwardly of said body for operation upon an upwardly facing end portion of the tubular means; said blades having upper and lower milling portions, said lower milling portions extending radially outwardly of the axis of said body to a substantially greater extent than upper milling portions of said blades, the longitudinal outer edges of said upper milling portions being substantially parallel to the axis of said tubular body.

2. In apparatus for milling away a tubular conduit disposed in a well bore: a tubular body adapted to be secured to a drill string and having a fluid passage therein; circumferentially spaced blades carried by and extending generally radially outwardly of said body for operation upon an upwardly facing end portion of the tubular conduit; each of said blades having a lower milling portion and an upper milling portion thereabove, said lower milling portion extending radially outwardly of the axis of said body to a substantially greater extent than said upper milling portion which constitutes the remainder of said blade thereabove, the longitudinal outer edge of each upper milling portion being substantially parallel to the axis of said tubular body; the radial outward extent of said outer edge of each blade being at least equal to the radius of the outer periphery of the tubular conduit.

3. In apparatus for milling away tubular means disposed in a well bore: a tubular body adapted to be secured to a drill string and having a fluid passage therein; circumferentially spaced blades carried by and extending generally radially outwardly of said body for operation upon an upwardly facing end portion of the tubular means; said blades having upper and lower milling portions, said lower milling portions extending radially outwardy of the axis of said body to a substantially greater extent than upper milling portions of said blades, the longitudinal outer edges of said upper milling portions being substantially parallel to the axis of said tubular body; said blades having transverse slots therein separating said upper and lower milling portions.

4. In apparatus for milling away a tubular conduit disposed in a well bore: a tubular body adapted to be secured to a drill string and having a fluid passage therein; circumferentially spaced blades carried by and extending generally radially outwardly of said body for operation upon an upwardly facing end portion of the tubular conduit; each of said blades having a lower milling portion and an upper milling portion thereabove, said lower milling portion extending radially outwardly of the axis of said body to a substantially greater extent than said upper milling portion which constitutes the remainder of said blade thereabove, the longitudinal outer edge of each upper milling portion being substantially parallel to the axis of said tubular body; the radial outward extent of said outer edge of each blade being at least equal to the radius of the outer periphery of the tubular conduit; each blade having a transverse slot therein separating its upper milling portion from its lower milling portion.

5. In apparatus for milling away a liner hanger set in a well casing and a liner secured to and depending from the hanger; a tubular body adapted to be secured to a drill string and having a fluid passage therein; circumferentially spaced elongate blades carried by and extending generally radially outwardly of said body for operation upon the hanger and liner; said blades having upper and lower milling portions, said lower milling portions having outer edges extending radially outwardly of the axis of said body to substantially the same extent as the maximum radius of the liner hanger, the longitudinal outer edge of each upper milling portion being substantially parallel to the axis of said tubular body, said outer edges of said upper portions extending radially outwardly of the axis of said body to a substantially lesser extent than the outer edges of said lower portions and at least to the same extent as the outside radius of the liner.

6. In apparatus for milling away a liner hanger set in a well casing and a liner secured to and depending from the hanger: a tubular body adapted to be secured to a drill string and having a fluid passage therein; circumferentially spaced elongate blades carried by and extending generally radially outwardly of said body for operation upon the hanger and liner; said blades having upper and lower milling portions, said lower milling portions having outer edges extending radially outwardly of the axis of said body to substantially the same extent as the maximum radius of the liner hanger, the longitudinal outer edge of each upper milling portion being substantially parallel to the axis of said tubular body, said outer edges of said upper portions extending radially outwardly of the axis of said body to a substantially lesser extent than the outer edges of said lower portions and at least to the same extent as the outside radius of the liner; said blades having transverse slots therein separating said upper and lower milling portions.

7. In apparatus for milling away tubular means disposed in a well bore: a tubular body adapted to be secured to a drill string and having a fluid passage therein; blade elements carried by and extending generally radially outwardly of said body for operation upon an upwardly facing end portion of the tubular means; said elements comprising upper and lower blade elements, said lower blade elements extending radially outwardly of the axis of said body to a substantially greater extent than upper blade elements, the longitudinal outer edges of each of said upper blade elements being substantially parallel to the axis of said tubular body.

References Cited in the file of this patent

UNITED STATES PATENTS

| | | |
|---|---|---|
| 1,698,496 | Gray | Jan. 8, 1929 |
| 1,801,482 | Boynton | Apr. 21, 1931 |
| 2,186,725 | Hughes | Jan. 9, 1940 |
| 2,481,637 | Yancey | Sept. 13, 1949 |
| 2,735,485 | Metcalf | Feb. 21, 1956 |